United States Patent
Cadima

(10) Patent No.: US 12,352,450 B2
(45) Date of Patent: Jul. 8, 2025

(54) GAS COOKTOP WITH GRIDDLE ASSEMBLY INCLUDING REMOVABLE TEMPERATURE PROBE

(71) Applicant: Haier US Appliance Solutions, Inc., Wilmington, DE (US)

(72) Inventor: Paul Bryan Cadima, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 366 days.

(21) Appl. No.: 17/993,379

(22) Filed: Nov. 23, 2022

(65) Prior Publication Data

US 2024/0167687 A1 May 23, 2024

(51) Int. Cl.
*F24C 3/12* (2006.01)
*F24C 15/36* (2006.01)

(52) U.S. Cl.
CPC .............. *F24C 3/126* (2013.01); *F24C 15/36* (2013.01)

(58) Field of Classification Search
CPC ................................ F24C 3/126; F24C 15/36
USPC ....................................................... 126/39 G
See application file for complete search history.

(56) References Cited

U.S. PATENT DOCUMENTS

| | | | |
|---|---|---|---|
| 5,413,032 A | 5/1995 | Bruno et al. | |
| 5,740,723 A * | 4/1998 | Lin | A47J 37/0682 99/422 |
| 7,255,100 B2 | 8/2007 | Repper et al. | |
| 8,084,719 B2 | 12/2011 | Ciancimino et al. | |
| 9,562,686 B2 | 2/2017 | Arenaza | |
| 9,841,191 B2 | 12/2017 | Johncock et al. | |
| 10,485,379 B2 | 11/2019 | Bennett et al. | |
| 10,584,871 B2 | 3/2020 | Biagioli et al. | |
| 10,619,858 B2 | 4/2020 | Paller | |
| 10,660,473 B2 | 5/2020 | Dahle et al. | |
| 10,935,250 B2 | 3/2021 | Andueza et al. | |
| 11,015,813 B2 | 5/2021 | Billman et al. | |
| 11,109,709 B2 | 9/2021 | Lee et al. | |
| 2002/0073985 A1 | 6/2002 | Leukhardt et al. | |
| 2013/0305933 A1 | 11/2013 | Heidrich et al. | |
| 2018/0338644 A1 | 11/2018 | Gossens et al. | |
| 2019/0309954 A1 | 10/2019 | Andueza et al. | |
| 2020/0300507 A1 | 9/2020 | Cowan et al. | |
| 2020/0408413 A1 | 12/2020 | Billman et al. | |
| 2021/0148575 A1 | 5/2021 | Cadima | |
| 2021/0172607 A1 * | 6/2021 | Cadima | F24C 3/082 |
| 2021/0254834 A1 | 8/2021 | Bhogal et al. | |

(Continued)

FOREIGN PATENT DOCUMENTS

| | | |
|---|---|---|
| CN | 201241956 Y | 5/2009 |
| CN | 106871168 B | 9/2020 |
| CN | 111692408 A | 9/2020 |

(Continued)

*Primary Examiner* — Vivek K Shirsat
(74) *Attorney, Agent, or Firm* — Dority & Manning, P.A.

(57) ABSTRACT

A gas cooktop defining includes a gas burner for selectively generating a flow of heated air, a grate positioned over the gas burner, and a griddle assembly seated on the grate over the gas burner, the griddle assembly comprising a griddle defining an outer side and a probe receptacle defined in the outer side, a temperature probe configured for receipt within the probe receptacle, and one or more flow control features for directing the flow of heated air around or away from the probe receptacle.

20 Claims, 8 Drawing Sheets

(56) References Cited

U.S. PATENT DOCUMENTS

2021/0274968 A1 9/2021 Steiner et al.
2022/0007889 A1 1/2022 Cadima

FOREIGN PATENT DOCUMENTS

| EP | 2896329 | B1 | 12/2018 |
| ES | 2725174 | T3 | 9/2019 |
| JP | H10246424 | A | 9/1998 |
| JP | 2015062666 | A | 4/2015 |
| JP | 2022013345 | A | 1/2022 |
| WO | WO2020008088 | A2 | 1/2020 |

* cited by examiner

GAS COOKTOP WITH GRIDDLE ASSEMBLY INCLUDING REMOVABLE TEMPERATURE PROBE

FIELD OF THE INVENTION

The present subject matter relates generally to gas cooktops, and more particularly, to griddle assemblies including removable temperature probes for use in gas cooktops.

BACKGROUND OF THE INVENTION

Conventional gas cooktop appliances have one or more gas burners, e.g., positioned at a cooktop surface for use in heating or cooking an object, such as a cooking utensil and its contents. These gas burners typically combust a mixture of gaseous fuel and air to generate heat for cooking. These gas cooktops may include a grate or other support structure for receiving various cooking utensils, such as a griddle. For example, griddles may be positioned on the grate of the gas cooktop and may extend across multiple gas burners to provide a large, flat cooking surface.

Notably, it may frequently be desirable to facilitate a closed loop cooking cycle with removable cooking utensils such as a griddle, e.g., by monitoring the temperature of the griddle and adjusting the gas burners to maintain the desired griddle temperature. Accordingly, conventional electric countertop appliances may include a temperature probe that is received within the griddle for providing temperature feedback. However, conventional electric appliances do not generate significant convective heating where temperature probes may be exposed to exceedingly high temperatures that may result in probe damage. In contrast, gas cooktops may create high levels of convective heating that may quickly damage known temperature probes. Accordingly, griddles having temperature feedback for use on gas appliances rely on permanently mounted sensors within the appliance. Moreover, such griddles are often non-removable from the appliance. Moreover, user removable griddles are commonly not placed or aligned perfectly by users of the cooktop, thereby potentially positioning any removable temperature probe such that electronics and heat sensitive parts are in a direct heating path of the gas burners.

Accordingly, a gas cooktop including a user removable griddle with temperature measuring capabilities would be useful. More specifically, a temperature probe that may be conveniently used with a removable griddle on a gas cooktop while avoiding excessive temperature exposure would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gas cooktop defining a vertical direction, a lateral direction, and a transverse direction is provided. The gas cooktop includes a gas burner for selectively generating a flow of heated air and a griddle assembly positioned over the gas burner. The griddle assembly includes a griddle defining an outer side and a probe receptacle defined in the outer side, a temperature probe configured for receipt within the probe receptacle, and one or more flow control features for directing the flow of heated air around or away from the probe receptacle.

In another exemplary embodiment, a griddle assembly for a gas cooktop is provided. The gas cooktop includes a gas burner for selectively generating a flow of heated air. The griddle assembly includes a griddle defining an outer side and a probe receptacle defined in the outer side, a temperature probe configured for receipt within the probe receptacle, and one or more flow control features for directing the flow of heated air around or away from the probe receptacle, the one or more flow control features including a flow channel defined within the griddle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
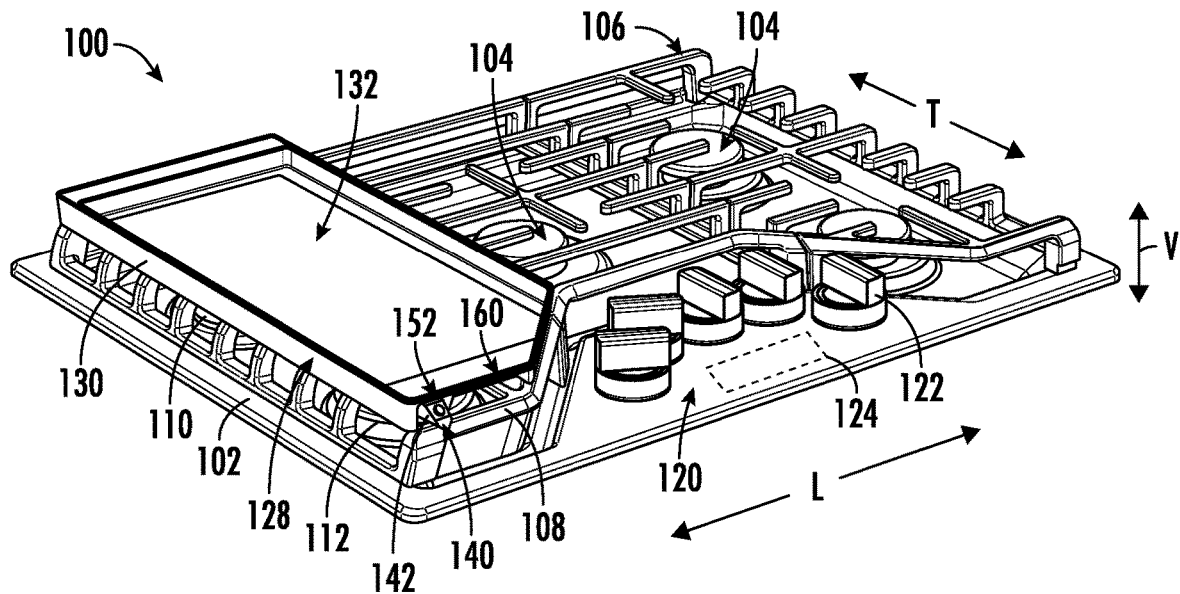
FIG. 1 provides a perspective view of a gas cooktop including a griddle assembly according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates an exemplary embodiment of a cooktop appliance, e.g., a gas cooktop 100, of the present disclosure. Gas cooktop 100 may be fitted integrally with a surface of a kitchen counter, may be configured as a slide-in cooktop unit, may be a part of a free-standing range cooking appliance, etc. Gas cooktop 100 may generally define a vertical direction V, a lateral direction L, and a transverse direction T, each of which is mutually perpendicular, such that an orthogonal coordinate system is generally defined. References to the horizontal direction or plane may refer generally to the plane defined by the lateral direction L and the transverse direction T.

Gas cooktop 100 includes a top panel 102 that includes one or more heating sources, such as heating elements 104 for use in, e.g., heating or cooking. Top panel 102, as used herein, refers to any upper surface of gas cooktop 100 over which utensils may be heated and therefore food cooked. In general, top panel 102 may be constructed of any suitably rigid and heat resistant material capable of supporting heating elements 104, cooking utensils, and/or other components of gas cooktop 100. By way of example, top panel 102 may be constructed of enameled steel, stainless steel, glass, ceramics, and combinations thereof.

According to the illustrated embodiment, the heating elements 104 of gas cooktop 100 are gas burners. However, although referred to as "gas cooktop" herein, it should be appreciated that aspects of the present subject matter may be applicable to other cooktop appliances, e.g., such as electrical resistance cooktops, inductive cooktops, etc. In addition, gas cooktop 100 may include one or more grates 106 configured to support a cooking utensil, such as a pot, pan, etc. In general, grates 106 include a plurality of elongated members 108, e.g., formed of cast metal, such as cast iron. The cooking utensil may be placed on the elongated members 108 of each grate 106 such that the cooking utensil rests on an upper surface of elongated members 108 during the cooking process. Heating elements 104 are positioned underneath the various grates 106 such that heating elements 104 provide thermal energy to cooking utensils above top panel 102 by combustion of fuel below the cooking utensils.

In some embodiments, the heating elements 104 of gas cooktop 100 may include a plurality of gas burners that are positioned on and/or within top panel 102 and have various sizes, as shown in FIG. 1, so as to provide for the receipt of cooking utensils (i.e., pots, pans, etc.) of various sizes and configurations and to provide different heat inputs for such cooking utensils. For example, the gas cooktop 100 may include a first gas burner 110 disposed on the top panel 102 and a second gas burner 112 spaced apart from the first gas burner 110 on the top panel 102. For example, as illustrated, the first gas burner 110 and the second gas burner 112 may be aligned along the transverse direction T. The top panel 102 may also include a recessed portion, e.g., which extends downward along the vertical direction V. The first gas burner 110 and the second gas burner 112 may be positioned within the recessed portion. The recessed portion may collect spilled material, e.g., foodstuffs, during operation of the gas cooktop 100.

In the illustrated example embodiments, each gas burner 110, 112 includes a generally circular shape from which a flame may be emitted. As shown, each gas burner 110, 112 includes a plurality of fuel ports defined circumferentially in fluid communication with an internal passage of each respective gas burner 110, 112. In some embodiments, one or both of the first gas burner 110 and the second gas burner 112 may be a multi-ring burner. For example, the first gas burner 110 may include a first plurality of fuel ports defining a first ring of the first gas burner 110 and a second plurality of fuel ports defining a second ring of the first gas burner 110. In such embodiments, a first fuel chamber in fluid communication with the first plurality of fuel ports may be separated from a second fuel chamber in fluid communication with the second plurality of fuel ports by a wall within the first gas burner 110, and fuel may be selectively supplied to one or both of the fuel chambers within first gas burner 110. In some embodiments of a cooktop appliance, multiple burners of differing types may be provided in combination, e.g., one or more single-ring burners as well as one or more multi-ring burners. Moreover, other suitable burner configurations are also possible.

According to the illustrated example embodiment, a user interface panel or control panel 120 is located within convenient reach of a user of gas cooktop 100. For this example embodiment, control panel 120 includes control knobs 122 that are each associated with one of heating elements 104. Control knobs 122 allow the user to activate each heating element 104 and regulate the amount of heat input each heating element 104 provides to a cooking utensil located thereon. Although gas cooktop 100 is illustrated as including control knobs 122 for controlling heating elements 104, it will be understood that control knobs 122 and the configuration of gas cooktop 100 shown in FIG. 1 is provided by way of example only. More specifically, control panel 120 may include various input components, such as one or more of a variety of touch-type controls, electrical, mechanical or electro-mechanical input devices including rotary dials, push buttons, and touch pads.

According to the illustrated embodiment, control knobs 122 are located within control panel 120 of gas cooktop 100. However, it should be appreciated that this location is used only for the purpose of explanation, and that other locations and configurations of control panel 120 and control knobs 122 are possible and within the scope of the present subject matter. Indeed, according to alternative embodiments, control knobs 122 may instead be located directly on top panel 102 or elsewhere on gas cooktop 100, e.g., on a backsplash, front bezel, or any other suitable surface of gas cooktop 100. Control panel 120 may also be provided with one or more graphical display devices, such as a digital or analog display device designed to provide operational feedback to a user.

Referring again to FIG. 1, operation of the gas cooktop 100 may be regulated by a controller 124 that is operably coupled to (i.e., in operative communication with) the user inputs (e.g., control knobs 122) and/or heating elements 104. In this regard, control panel 120, control knobs 122, and other suitable inputs/outputs may be in communication with controller 124 such that controller 124 may regulate operation of gas cooktop 100. For example, signals generated by controller 124 may operate gas cooktop 100, including any or all system components, subsystems, or interconnected devices, in response to the position of control knobs 122 and other control commands. Control panel 120 and other components of gas cooktop 100 may be in communication with controller 124 via, for example, one or more signal lines or shared communication busses. In this manner, Input/Output ("I/O") signals may be routed between controller 124 and various operational components of gas cooktop 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 124 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 124 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 124 may be operable to execute programming instructions or micro-control code associated with an operating cycle of gas cooktop 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 124 as disclosed herein is capable of and may be operable to perform any methods, method steps, or portions of methods as disclosed herein. For example, in some embodiments, methods disclosed herein may be embodied in programming instructions stored in the memory and executed by controller 124.

The memory devices may also store data that can be retrieved, manipulated, created, or stored by the one or more processors or portions of controller 124. The data can include, for instance, data to facilitate performance of methods described herein. The data can be stored locally (e.g., on controller 124) in one or more databases and/or may be split up so that the data is stored in multiple locations. In addition, or alternatively, the one or more database(s) can be connected to controller 124 through any suitable network(s), such as through a high bandwidth local area network (LAN) or wide area network (WAN). In this regard, for example, controller 124 may further include a communication module or interface that may be used to communicate with one or more other component(s) of gas cooktop 100, controller 124, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

As shown in FIGS. 1 through 15, gas cooktop 100 may further include a griddle assembly 128 that may be installed on gas cooktop 100 as a cooking utensil. In general, griddle assembly 128 may include a griddle 130 that it selectively disposed over (e.g., directly above) one or more spaced-apart heating elements 104. For example, according to the illustrated embodiment, griddle 130 is positioned over a pair of burners, e.g., first gas burner 110 and second gas burner 112 to define a single, flat cooking surface collectively heated by gas burners 110, 112. Specifically, during use, a top surface 132 of griddle 130 (i.e., a cooking surface) faces away from top panel 102 to receive a cooking item (e.g., food) thereon. By contrast, a bottom surface 134 may be opposite from top surface 132 and faces top panel 102 during use. Thus, the bottom surface 134 may face top panel 102 to receive a thermal output (e.g., flame or heated air as identified generally by reference numeral 136 in FIGS. 5-6 and 12-13) from the corresponding burners 110, 112.

Figure 4:
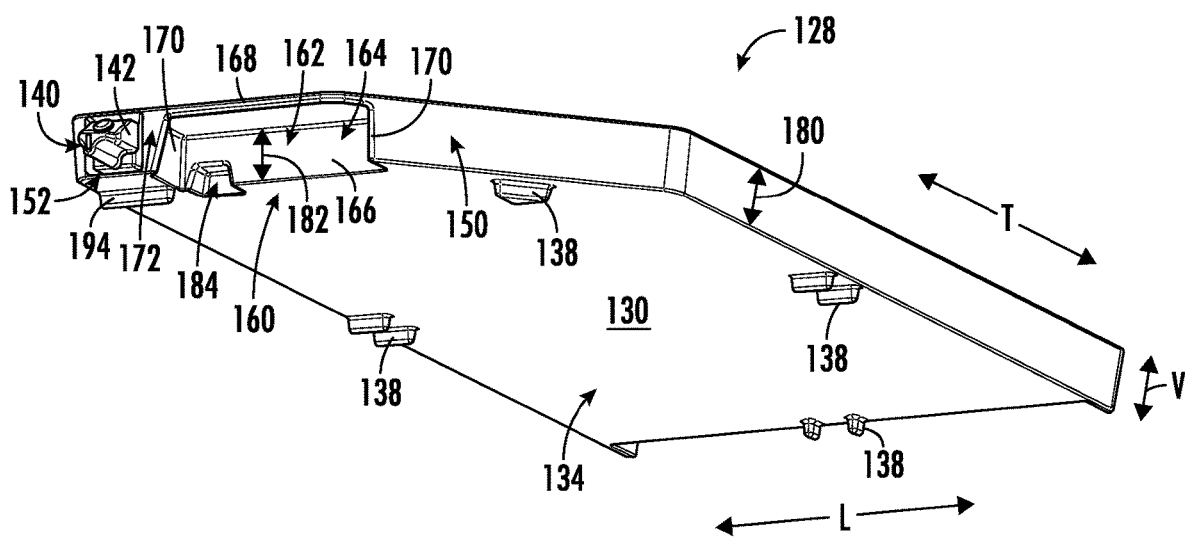
FIG. 4 provides a bottom, perspective view of the exemplary temperature probe of FIG. 3 in the exemplary griddle assembly of FIG. 1 according to example embodiments of the present subject matter.

The bottom surface 134 of the griddle 130 may be supported by grate 106 when positioned on gas cooktop 100. For example, bottom surface 134 of the griddle 130 may be in contact with one or more elongated members 108 of grate 106, such as with a peripheral support surface and an intermediate support surface thereof. In addition, it should be appreciated that grate 106 and/or griddle 130 may define complementary features to facilitate proper positioning and alignment of griddle 130 on gas cooktop 100. In this regard, grate 106 may define engagement features (e.g., such as elongated members 108) and griddle 130 may define complementary features (e.g., such as a geometry of outer side 150 or feet 138 as shown in FIG. 4), such that the engagement features and the complementary features are configured to engage when griddle 130 is mounted on grate 106 to secure the position of griddle 130. For example, the edges or perimeter of griddle 130 may have a complementary footprint designed for seating on elongated members 108 of grate 106. In addition, or alternatively, feet 138 may be sized and positioned on bottom surface 134 of griddle 130 to securely engage elongated members 108 when griddle 130 is properly positioned on grate 106. Grate 106 and griddle 130 may further define one or more protrusions and complementary detents, complementary ribs and grooves, etc.

Griddle 130 may be formed from any material that is suitably rigid and suitable for high temperature cooking operations. In this regard, for example, griddle 130 may be formed from a nonferrous material, such as aluminum alloy. According to still other embodiments, griddle 130 may be formed from a ferrous material, such as cast iron or stainless steel. Other materials and griddle constructions are possible and within the scope of the present subject matter.

In some embodiments, gas cooktop 100 may be configured for closed-loop cooking. For example, controller 124 may be operable to receive a set temperature (such as from a user input of the gas cooktop 100 or wirelessly from a remote device such as a smartphone) and compare the set temperature to temperature measurements from one or more temperature sensors, such as a temperature sensor associated with a cooking utensil (such as griddle 130), to each gas burner 110, 112. Controller 124 may be further programmed to automatically adjust each burner, such as a fuel flow rate to each burner, based on the comparison of the corresponding temperature measurement to the set temperature.

Accordingly, gas cooktop 100 or griddle assembly 128 may include a removably embedded temperature sensor 140 to provide temperature feedback to facilitate such a closed loop cooking process. For example, according to the illustrated embodiment, temperature sensor 140 may generally include a sensor housing 142 and a temperature probe 144 extending therefrom for receipt within griddle 130, as described in more detail below. In general, sensor housing 142 may contain operating electronics and a wireless communication module, e.g., for communicating with controller 124 of gas cooktop 100. For example, the sensor housing 142 and temperature probe 144 may be formed as a single, hermetically sealed package.

As used herein, "temperature sensor" or the equivalent is intended to refer to any suitable type of temperature measuring system or device positioned at any suitable location for measuring the desired temperature. Thus, for example, temperature sensor 140 may each be any suitable type of temperature sensor, such as a thermistor, a thermocouple, a resistance temperature detector, a semiconductor-based integrated circuit temperature sensor, etc. In addition, temperature sensor 140 may be positioned at any suitable location and may output a signal, such as a voltage, to a controller that is proportional to and/or indicative of the temperature being measured. Although exemplary positioning of temperature sensors is described herein, it should be appreciated that gas cooktop may include any other suitable number, type, and position of temperature sensors according to alternative embodiments.

As shown, griddle 130 may be configured to removably and securely receive temperature sensor 140. For example, as illustrated in the figures, griddle 130 may define an outer side 150, e.g., an outer perimeter of griddle 130 within a horizontal plane (e.g., defined by the lateral direction L and the transverse direction T). Temperature sensor 140 may be slidably received within griddle 130 through outer side 150. More specifically, for example, griddle 130 may define a probe receptacle 152 within outer side 150. Probe receptacle 152 may generally include a probe channel 154 that is configured for slidably receiving temperature probe 144 and a housing recess 156 that is generally configured for receiving sensor housing 142.

According to example embodiments, probe receptacle 152 may be designed to securely receive temperature sensor 140 in a predetermined orientation. In this regard, probe receptacle 152 and temperature sensor 140 may be "poka-yoked," or designed such that improper installation of temperature sensor 140 is unlikely or not possible at all. In this regard, for example, housing recess 156 may have a specific geometry or footprint that corresponds to the geometry of sensor housing 142, e.g., such that sensor housing 142 may only be received within housing recess 156 in a particular orientation. In addition, temperature probe 144 may be offset relative to a center of sensor housing 142 and probe channel 154 may be similarly offset relative to housing recess 156. In this manner, temperature sensor 140 may need to be oriented in a particular manner for receipt within probe receptacle 152. Other means for ensuring proper alignment and installation of temperature sensor are possible and within the scope of the present subject matter.

Figure 2:
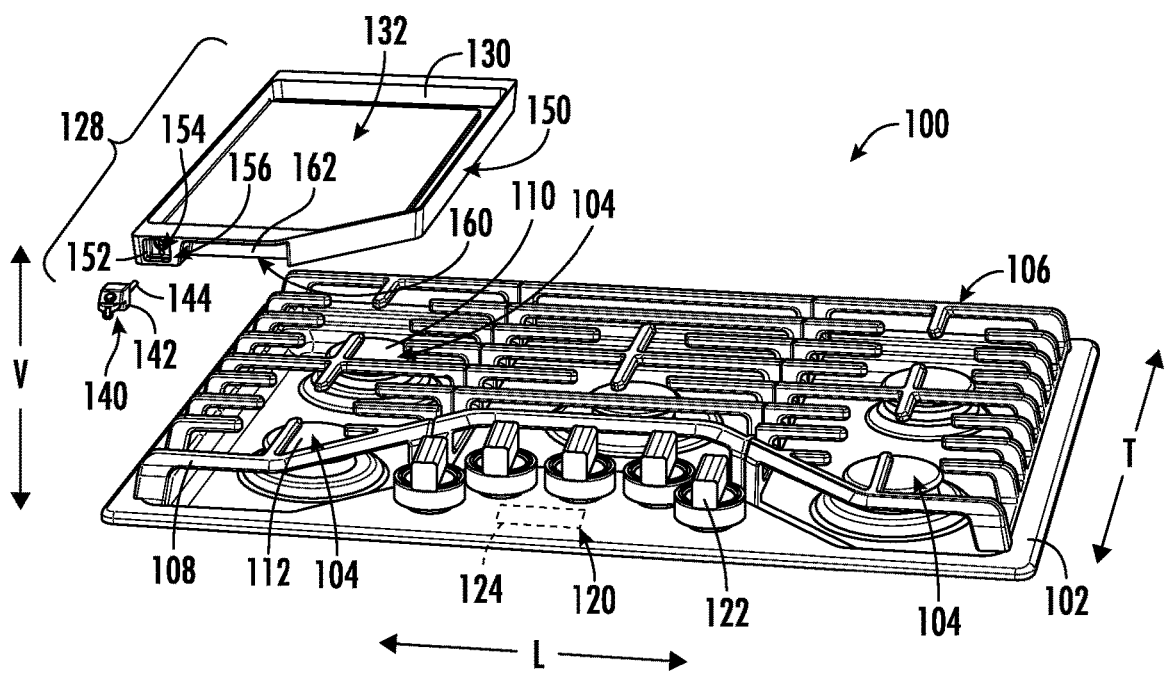
FIG. 2 illustrates the exemplary griddle assembly of FIG. 1 separated from the exemplary gas cooktop of FIG. 1 according to example embodiments of the present subject matter.
Figure 3:
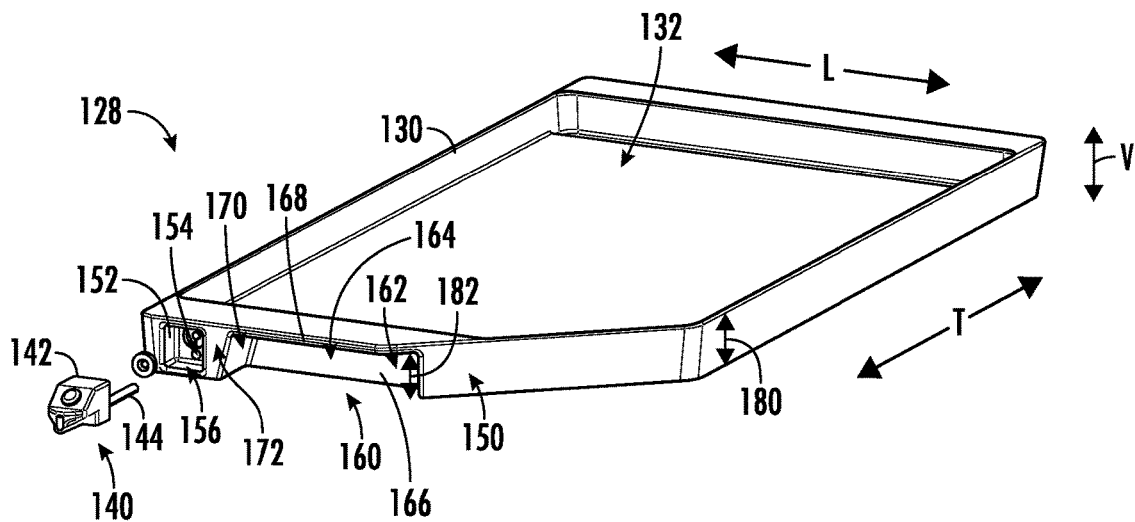
FIG. 3 provides a top, perspective view of a temperature probe removed from the exemplary griddle assembly of FIG. 1 according to example embodiments of the present subject matter.
Figure 10:
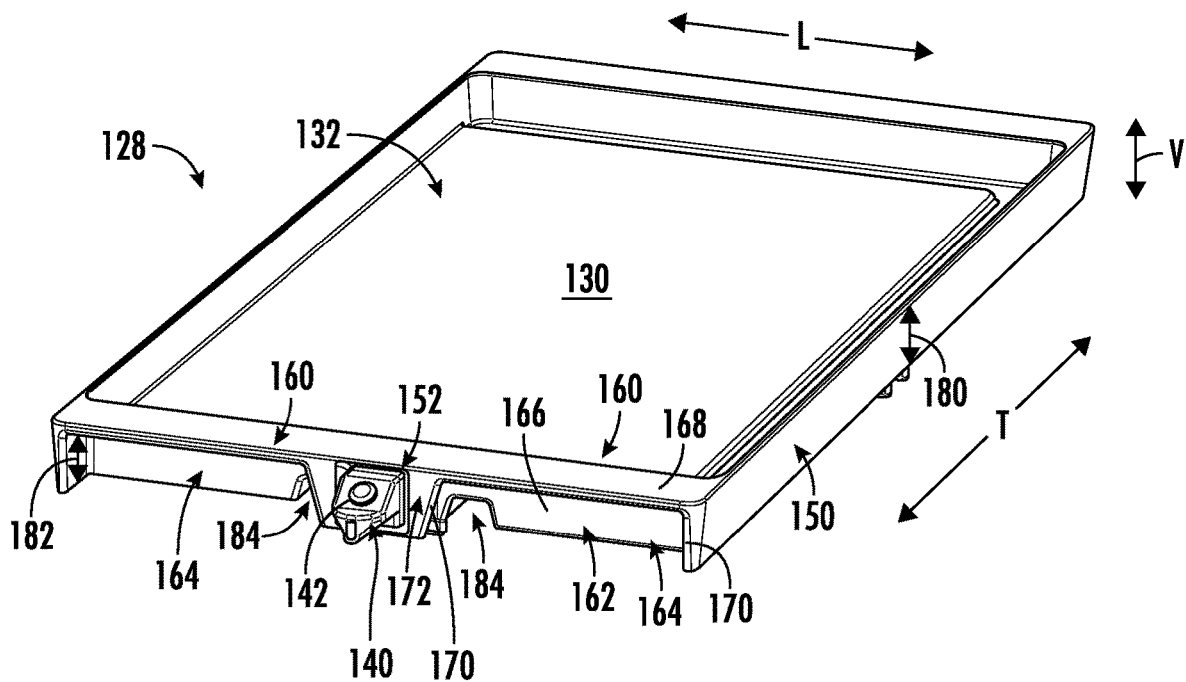
FIG. 10 provides a top, perspective view of a griddle assembly that may be used with the exemplary gas cooktop of FIG. 1 according to example embodiments of the present subject matter.
Figure 11:
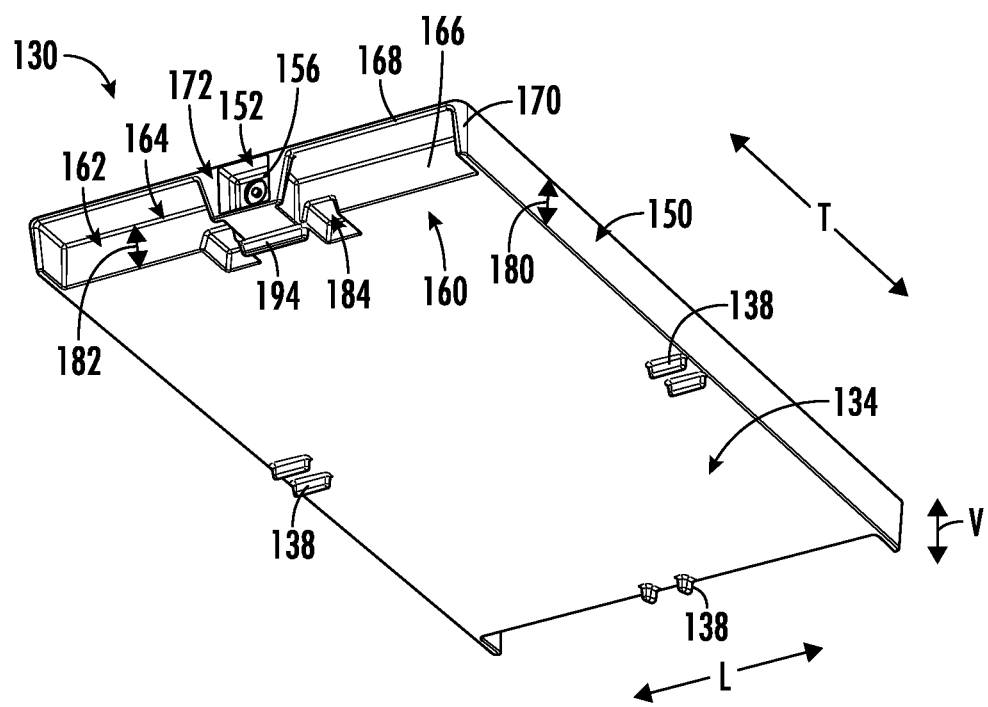
FIG. 11 provides a bottom, perspective view of the exemplary griddle assembly of FIG. 10 according to example embodiments of the present subject matter.

It should be appreciated that probe receptacle 152 may be positioned at any suitable location on griddle 130. According to the example illustrated embodiments, probe receptacle is defined on a front side (e.g., forward along the transverse direction) of outer side 150, e.g., to facilitate ease of manipulation by a consumer. In addition, probe receptacle 152 may be defined on a front, corner of griddle 130 (e.g., on a front, left corner as shown in FIG. 2) or at a center of griddle 130 along the lateral direction (e.g., as shown in FIG. 10). In this manner, temperature sensor 140 may be maintained at a suitable distance from second gas burner 112, thereby lowering its operating temperature and extending its operating lifetime.

As explained briefly above, conventional temperature probes used in electric appliances are not subjected to same high temperatures typical of gas cooking. For example, gas cooktops may create high levels of convective heating that rise up along the sides that may quickly damage known temperature probes. Accordingly, griddles having temperature feedback for use on gas appliances rely on permanently mounted sensors within the appliance, and often non-removable griddles. Moreover, griddles are commonly not placed or aligned perfectly by users of the cooktop, thereby increasing the risk of unknowingly positioning a removable temperature probe with electronics and heat sensitive parts in a direct heating path of the gas burners. Accordingly, aspects of the present subject matter are generally directed to features for ensuring that the operating temperatures of temperature sensor 140 remain within acceptable levels.

Referring now generally to FIGS. 2 through 15, griddle 130 may generally define one or more flow control features 160 for directing the flow of heated air 136 around or away from probe receptacle 152 and temperature sensor 140. As used herein, flow control features 160 may be used generally to refer to channels, passages, guide vanes, and other features defined in or positioned on griddle 130 that are intended to redirect the flow of heated air 136 generated by gas burners 110, 112 away from probe receptacle 152 and temperature sensor 140. Although exemplary flow control features 160 are described herein, it should be appreciated that the size, geometry, and configuration of such features may vary while remaining within the scope of the present subject matter.

As shown generally in FIGS. 1 through 15, flow control features 160 may include one or more flow channels 162 that are defined within griddle 130. Specifically, referring to the embodiment illustrated in FIGS. 1 through 3, flow channel 162 may include a recess 164 defined in a front edge of griddle 130. In this regard, recess 164 may be defined by a back wall 166, a top wall 168, and two side walls 170. Outer side 150 of griddle 130 may further define a front face 172 that surrounds or defines probe receptacle 152. In general, recess 164 of flow channel 162 may allow the flow of heated air 136 to rise relative to the front face 172 before reaching front face 172. Specifically, the flow of heated air 136 may first reach back wall 166 and may rise along the back wall 166 before reaching top wall 168. The flow of heated air 136 may be generally passed forward along the transverse direction T and over outer side 150 of griddle 130.

Notably, by defining top wall 168 toward the top surface 132 of griddle 130, the heated air 136 may be ejected from flow channel 162 above some or all of temperature sensor 140, thereby resulting in a cooler operating temperature of temperature sensor 140. According to an example embodiment, top wall 168 of flow channel 162 is positioned entirely above temperature probe 144 or probe receptacle 152. Notably, the depth of flow channel 162 may vary as needed depending on the application to permit more or less rise of the flow of heated air 136 while ensuring rigidity of griddle 130. For example, griddle 130 may define a griddle thickness 180 that is measured along the vertical direction V between top surface 132 and bottom surface 134 (e.g., a max thickness or a thickness at outer side 150). Similarly, flow channel 162 may define a channel depth 182 measured from the bottom of the sidewalls 170 to top wall 168 along the vertical direction V. According to example embodiments, channel depth 182 is greater than half of griddle thickness 180, greater than three-quarters of griddle thickness 180, greater than nine-tenths of griddle thickness 180, or greater.

Figure 5:
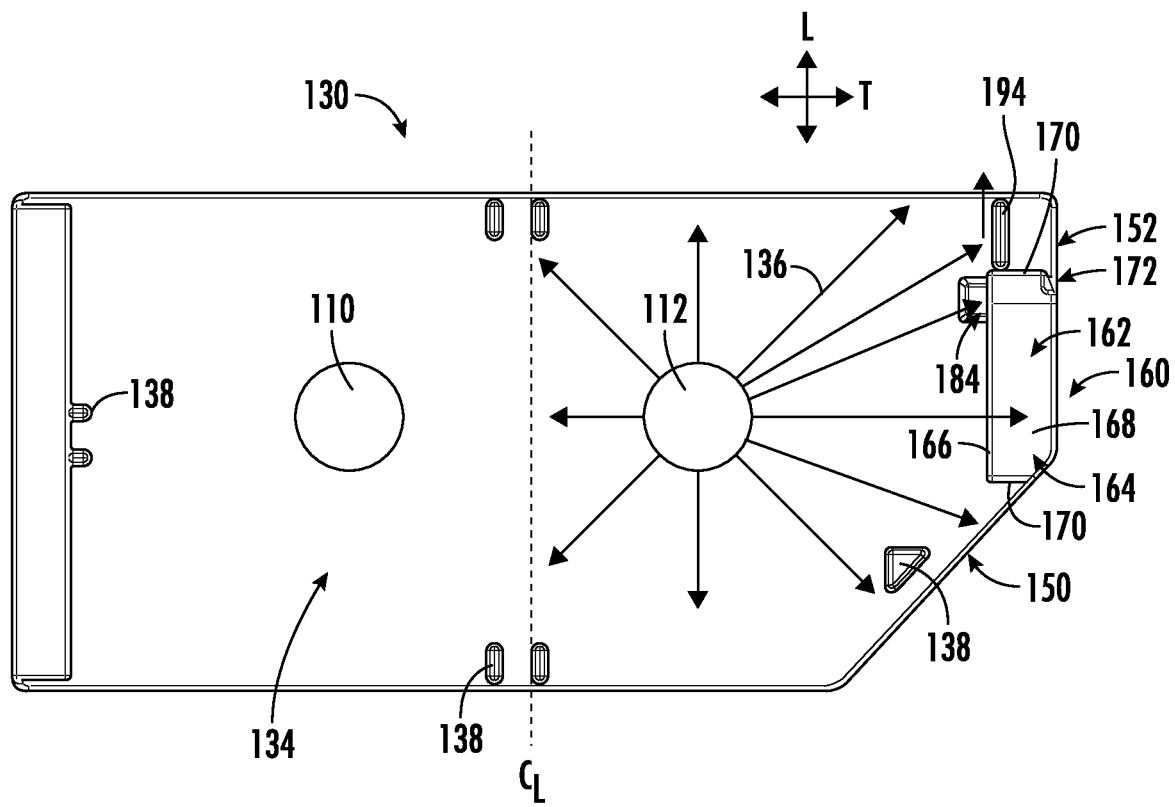
FIG. 5 provides a bottom view of a griddle assembly that may be used with the exemplary gas cooktop of FIG. 1 showing the griddle assembly discharging heated air according to example embodiments of the present subject matter.
Figure 6:
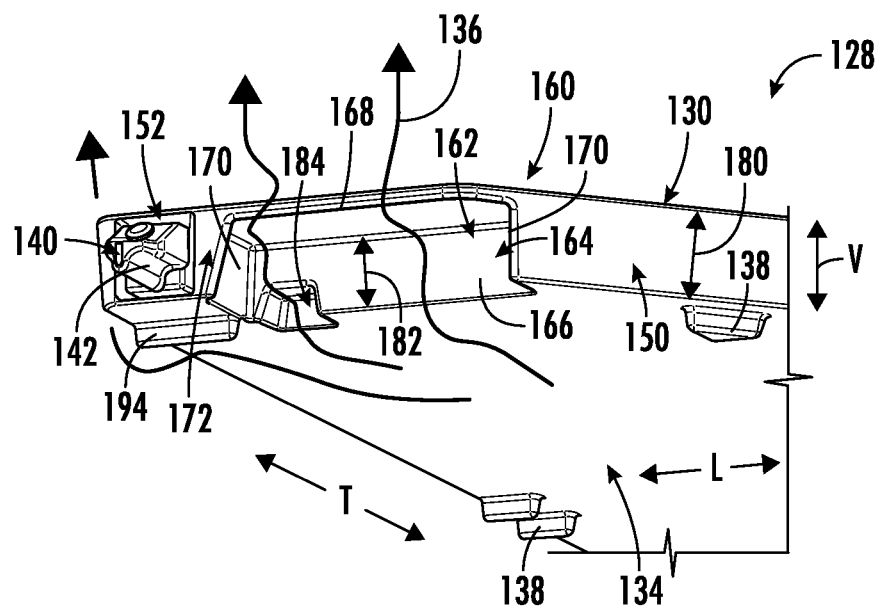
FIG. 6 provides a bottom, perspective view of the exemplary griddle assembly of FIG. 5 discharging the heated air according to example embodiments of the present subject matter.

Referring now specifically to FIGS. 4 through 6, another example embodiment of griddle 130 with a slightly modified flow channel 162 is illustrated. Due to the similarity between embodiments, like numerals may be used to refer to the same or similar features. As shown, flow channel 162 may further comprise a secondary recess 184 that is defined in back wall 166 of recess 164. In this manner, flow channel 162 may be "stair-stepped" to permit the flow of heated air 136 to slowly rise relative to front face 172 and be discharged above temperature sensor 140 (e.g., instead of flowing directly over temperature sensor 140). Specifically, FIGS. 5 and 6 illustrate the flow of heated air 136 rising and being directed around probe receptacle 152.

According to the illustrated embodiments, front face 172 of outer side 150 is formed in a single plane with the remainder of outer side 150. However, it should be appreciated that according to alternative embodiments, front face 172 may protrude beyond outer side 150 along the transverse direction T. In this manner, additional distance between the flow of heated air 136 and temperature sensor 140 may be obtained. In addition, although temperature sensor 140 is illustrated as having a sensor housing 142 that protrudes at least partially from griddle 130, it should be appreciated that according to alternative embodiments, temperature sensor 140 may be fully or partially inserted into and recessed within probe receptacle 152.

Figure 7:
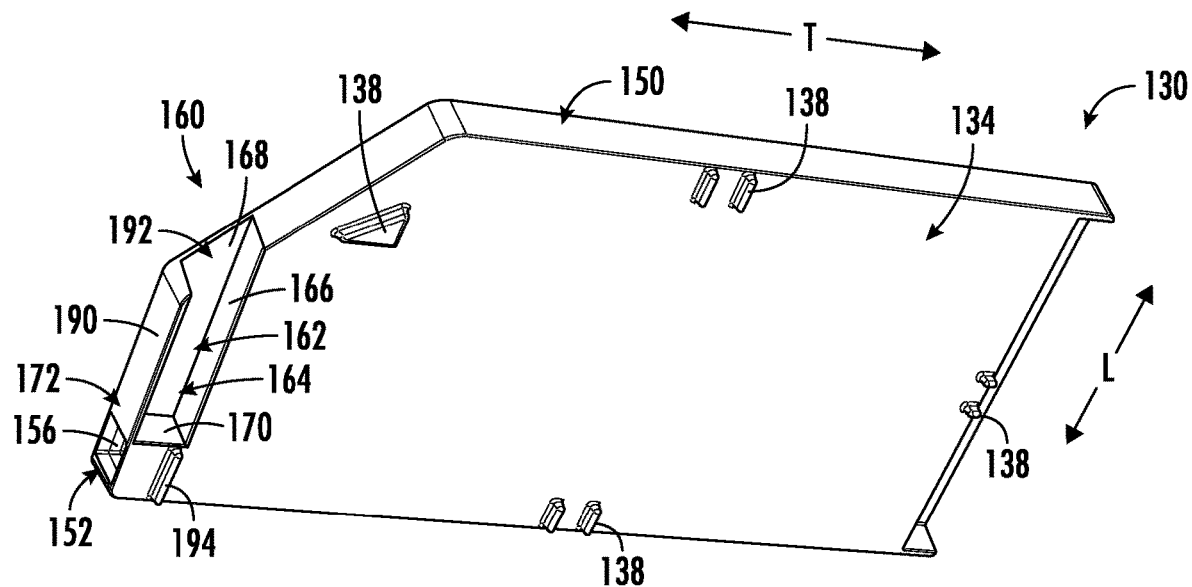
FIG. 7 provides a bottom, perspective view of a griddle assembly that may be used with the exemplary gas cooktop of FIG. 1 according to example embodiments of the present subject matter.
Figure 8:
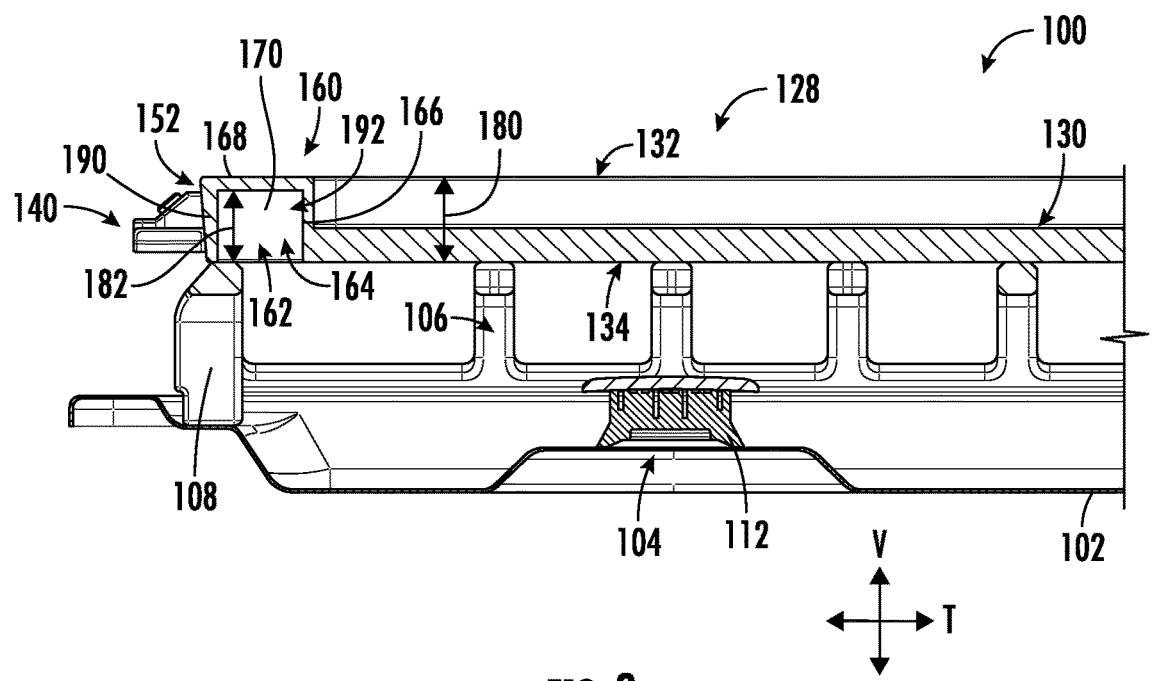
FIG. 8 provides a side, sectional view of the exemplary griddle assembly of FIG. 7 mounted to the exemplary gas cooktop of FIG. 1 according to example embodiments of the present subject matter.

Referring now specifically to FIGS. 7 and 8, another example embodiment of griddle 130 is illustrated. As shown, flow channel 162 further includes a front wall 190 (e.g., corresponding to a front portion of outer side 150). Front wall 190 generally defines a forward boundary of recess 164. Griddle 130 further defines a discharge opening 192 for discharging the flow of heated air 136 away from temperature sensor 140. As shown, front wall 190 may be seated on a forward elongated member 108 of grate 106. In this manner, the flow of heated air 136 may pass into recess 164 where it is blocked by front wall 190 and discharge along the lateral direction away from temperature sensor 140.

Figure 9:
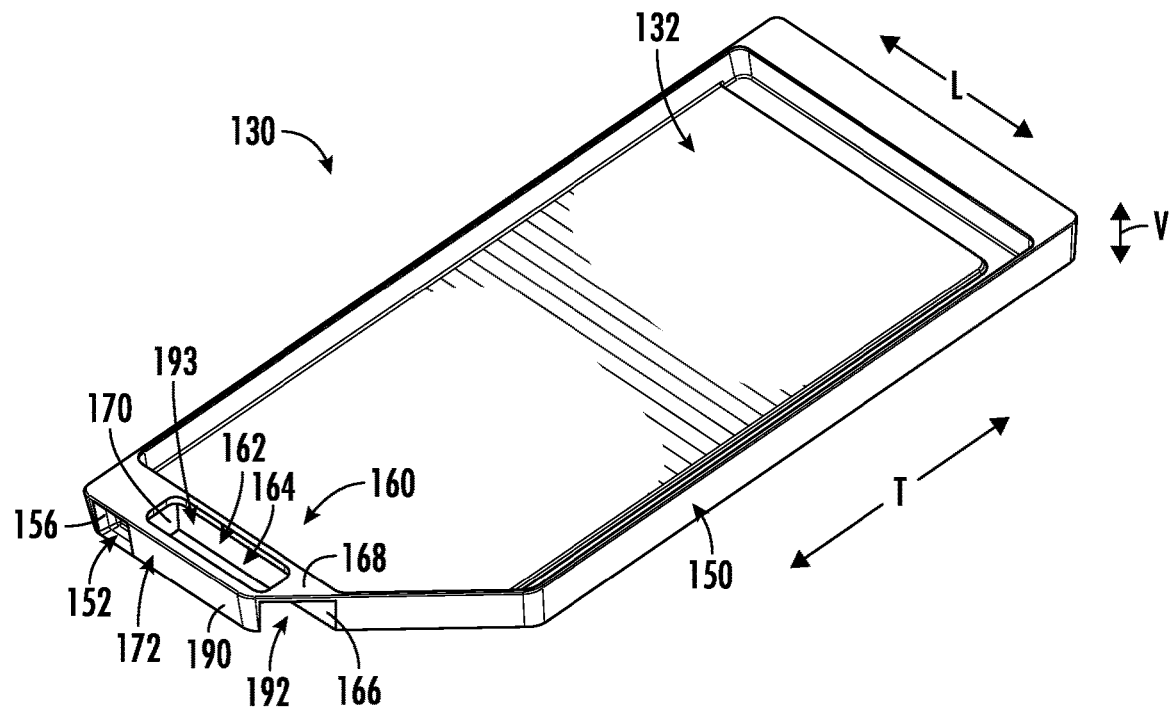
FIG. 9 provides a top, perspective view of a griddle assembly that may be used with the exemplary gas cooktop of FIG. 1 according to example embodiments of the present subject matter.

By contrast, referring again briefly to FIG. 1, the griddle 130 according to an embodiment may include a horizontal gap (e.g., the transverse depth of recess 164) that provides a space between back wall 166 and the front bar or elongated member 108. According to still another embodiment as shown in FIG. 9, griddle 130 may define a top discharge 193 where the flow channel 162 may extend through the top surface 132 of griddle 130. In this manner, the flow of heated air 136 may be directed upward through griddle 130 as well as through discharge opening 192.

Figure 12:
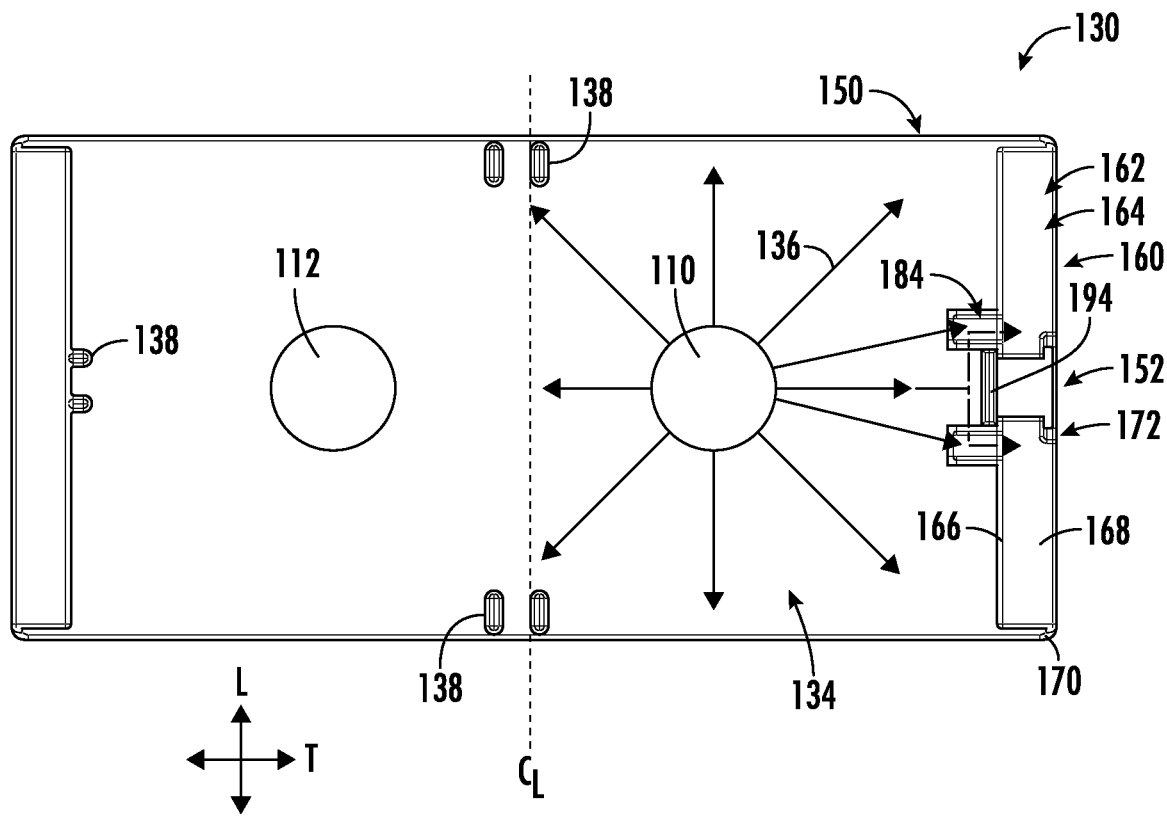
FIG. 12 provides a bottom view of the exemplary griddle assembly of FIG. 10 discharging heated air according to example embodiments of the present subject matter.
Figure 13:
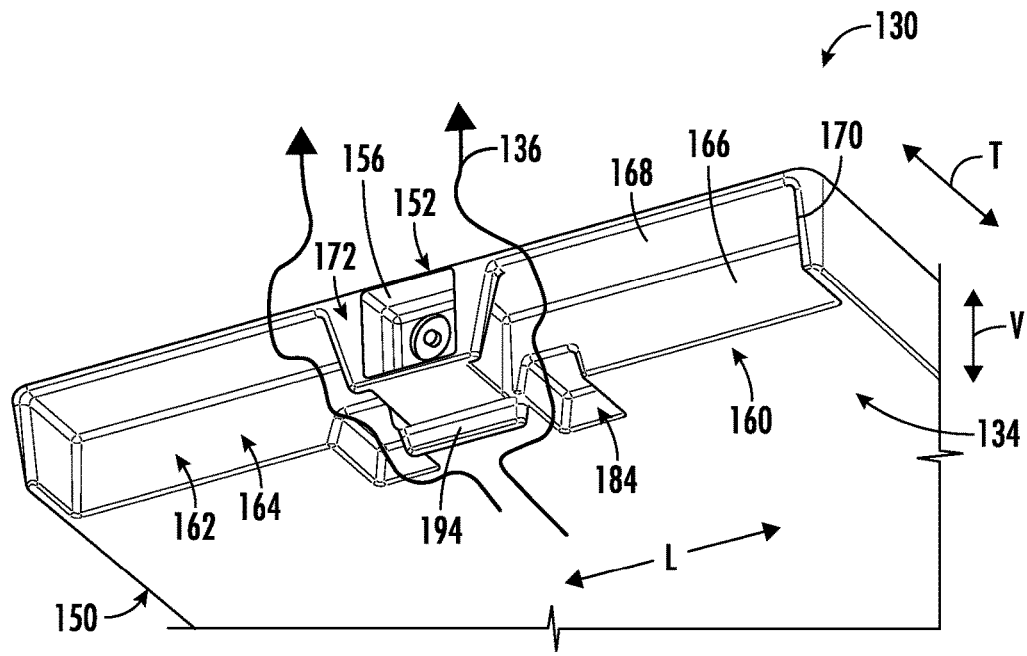
FIG. 13 provides a bottom, perspective view of the exemplary griddle assembly of FIG. 10 discharging the heated air according to example embodiments of the present subject matter.

Referring now generally to FIGS. 10 through 13, griddle 130 according to still another example embodiment is illustrated. As shown, probe receptacle 152 may be positioned toward a center of griddle 130 along the lateral direction L. In addition, flow channel 162 may include two recesses 164 positioned on each lateral side of probe receptacle 152. In this manner, as shown in FIGS. 12 and 13, the flow of heated air 136 may be directed around both sides of temperature sensor 140.

According to example embodiments, flow control features may further include one or more flow control vanes 194 may generally extend down from bottom surface 134 of griddle 130 along the vertical direction V. These flow control vanes 194 are generally configured for redirecting the flow of heated air. These flow control vanes 194 may be used independently of or in conjunction with flow channels 162 for improved heat management. For example, flow control vanes 194 may at least partially define a boundary of flow channels 162 within griddle 130. In this manner, the flow of air redirected by flow control vanes 194 may be directed directly into flow channel 162 and may be discharged away from griddle 130. For example, as best illustrated in FIGS. 5 and 6, flow control vanes 194 may be positioned directly underneath probe receptacle 152 for redirecting the flow of heated air 136 around probe receptacle 152.

Figure 14:
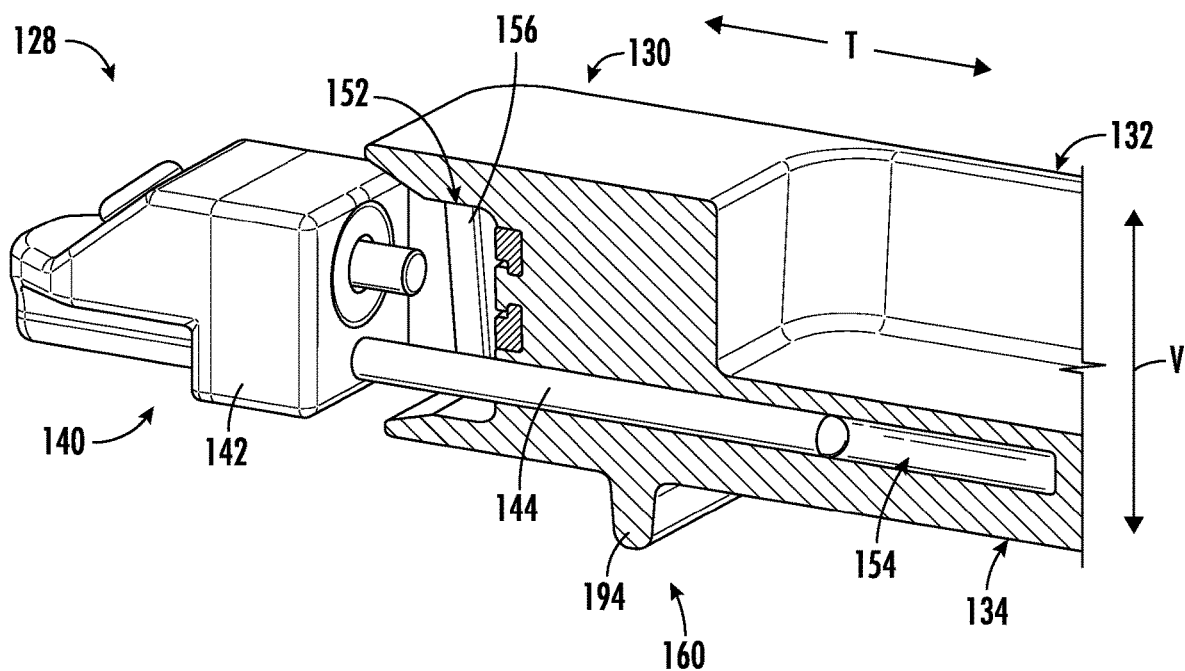
FIG. 14 provides a cross-sectional view of the exemplary temperature probe of FIG. 3 before being installed in the exemplary gas cooktop of FIG. 1 according to example embodiments of the present subject matter.
Figure 15:
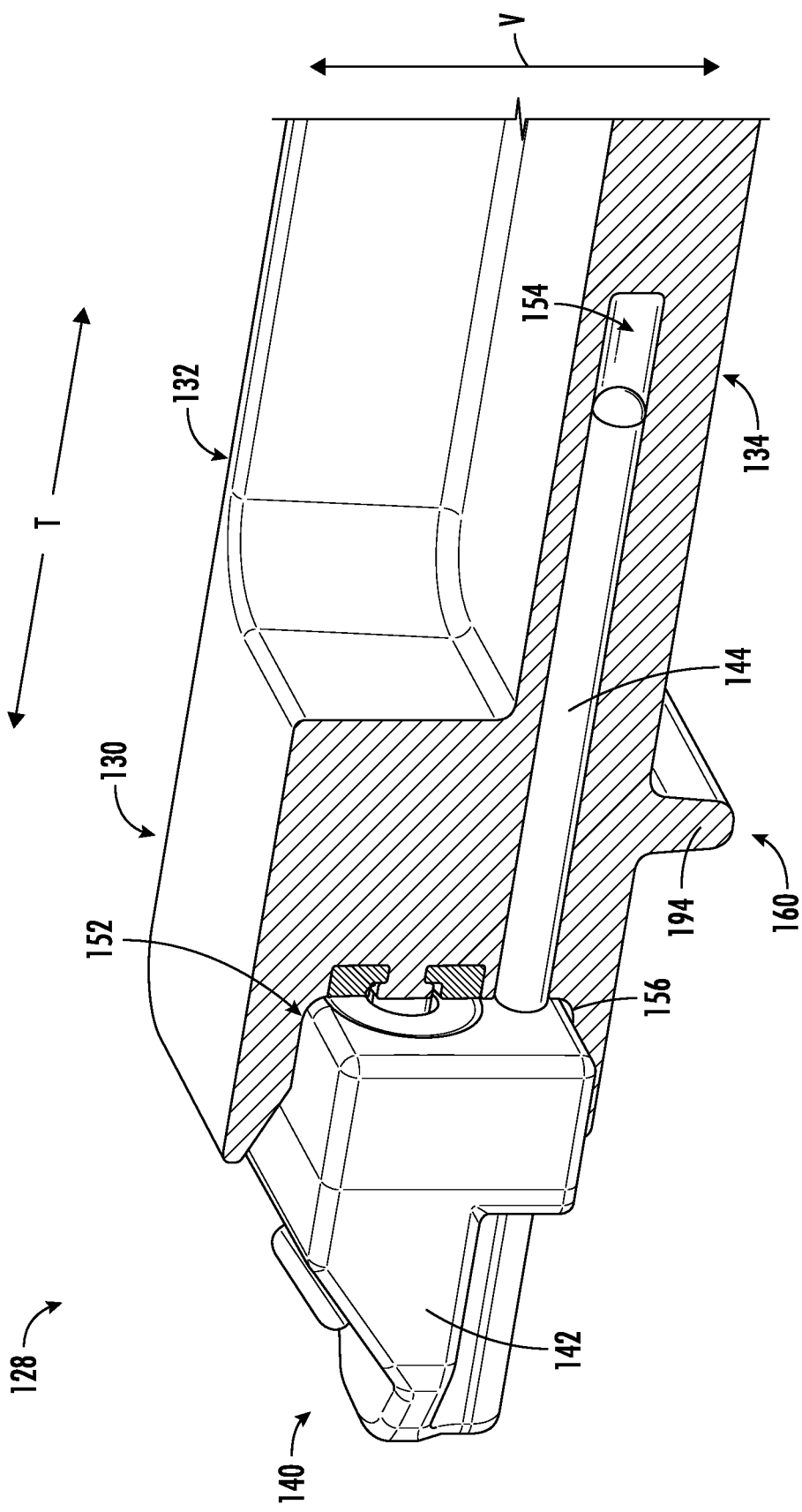
FIG. 15 provides a cross-sectional view of the exemplary temperature probe of FIG. 3 after being installed in the exemplary gas cooktop of FIG. 1 according to example embodiments of the present subject matter.

Referring now briefly to FIGS. 14 and 15, temperature sensor 140 is illustrated as being installed into probe receptacle 152. More specifically, FIG. 14 illustrates the temperature probe 144 as it is sliding into probe channel 154 and FIG. 15 illustrates temperature sensor 140 after being fully installed. Notably, whether temperature sensor 140 is positioned at a center of griddle 130 (e.g., as shown in FIGS. 10-13) or at a front corner of griddle 130 (e.g., as shown in FIGS. 1-9 and 14-15), controller 124 may be in operative communication with temperature sensor 140 and may be used to obtain accurate temperature measurements of griddle 130. In this regard, for example, controller 124 may be configured to obtain a temperature measurement at the corner of griddle 130 using the temperature probe 144 and determine a center griddle temperature of the griddle using the temperature measurement and a transfer function or mathematical relationship.

As explained herein, aspects of the present subject matter are generally directed to a griddle that has a removable wireless temperature probe for gas cooking appliances. The griddle or pan may be a rectangular shape, may include a handle at two ends, and may include a receptacle at one end of the griddle to house the temperature sensor. The temperature sensor can be removed before cleaning the griddle. The receptacle may be recessed within an end of the griddle, may be positioned anywhere along the end, with a corner being preferable as it is furthest from a burner center and the receptacle is adjacent either one or a combination of vanes and recessed regions that urge convective exhausts above or away from the temperature sensor. The vanes may deflect and alter the flow of exhaust in selective regions. The vanes may also be used as locating features to locate the griddle on the grates.

The recessed ducts adjacent to the receptacle may cause the exhaust to rise above the level of the temperature sensor prior to reaching the receptacle outside face. For example, according to example embodiments, for the grates with raised frames or continuous sections at the griddle ends, a horizontal gap between griddle and grate frame provides a means to exhaust burner heat. For example, the horizontal gap may precede the receptacle face. According to other example embodiments, for grates with lower frames at griddle ends, the griddle may have at least one first vertical surface along the bottom at the end defining a duct or means to urge exhaust upward. For example, this face is inward of the receptacle face. According to still other embodiments, for grates with raised frames, the exhaust may flow to the griddle end and may be diverted to the sides of the griddle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas cooktop defining a vertical direction, a lateral direction, and a transverse direction, the gas cooktop comprising:
   a gas burner for selectively generating a flow of heated air; and
   a griddle assembly positioned over the gas burner, the griddle assembly comprising:
      a griddle defining an outer side and a probe receptacle defined in the outer side;
      a temperature probe configured for receipt within the probe receptacle; and
      one or more flow control features for directing the flow of heated air around or away from the probe receptacle, wherein the one or more flow control features comprises a flow channel defined within the griddle and extending through a top surface of the griddle.

2. The gas cooktop of claim 1, wherein the probe receptacle is defined at least in part by a front face, and wherein the flow channel allows the flow of heated air to rise relative to the front face along the vertical direction before reaching the front face.

3. The gas cooktop of claim 1, wherein a top wall of the flow channel is positioned above the temperature probe.

4. The gas cooktop of claim 1, wherein a front bar of a grate extends below the outer side of the griddle, and wherein a back wall of the flow channel is spaced apart from the front bar to define a horizontal gap.

5. The gas cooktop of claim 1, wherein the griddle defines a griddle thickness and the flow channel defines a channel depth, wherein the channel depth is greater than half of the griddle thickness.

6. The gas cooktop of claim 5, wherein the channel depth is greater than three-quarters of the griddle thickness.

7. The gas cooktop of claim 1, further comprising:
   a grate positioned over the gas burner, wherein the griddle is seated on the grate.

8. The gas cooktop of claim 7, wherein the grate defines engagement features and the griddle defines complementary features, the engagement features and the complementary features configured to engage when the griddle is properly mounted on the grate to ensure a griddle position.

9. The gas cooktop of claim 7, wherein the one or more flow control features comprises:
   a flow control vane that extends down from the griddle along the vertical direction to redirect the flow of heated air.

10. The gas cooktop of claim 9, wherein the flow control vane at least partially forms a boundary of a flow channel defined within the griddle.

11. The gas cooktop of claim 1, wherein the outer side is a front of the griddle along the transverse direction.

12. The gas cooktop of claim 11, wherein the probe receptacle is defined at a corner of the griddle.

13. The gas cooktop of claim 12, further comprising a controller configured to:
   obtain a temperature measurement at the corner of the griddle using the temperature probe; and
   determine a center griddle temperature of the griddle using the temperature measurement and a transfer function or mathematical relationship.

14. The gas cooktop of claim 1, wherein the griddle is formed from a nonferrous material.

15. The gas cooktop of claim 1, wherein the griddle is formed from aluminum alloy.

16. A griddle assembly for a gas cooktop, the gas cooktop comprising a gas burner for selectively generating a flow of heated air, the griddle assembly comprising:
   a griddle defining an outer side and a probe receptacle defined in the outer side;
   a temperature probe configured for receipt within the probe receptacle; and
   one or more flow control features for directing the flow of heated air around or away from the probe receptacle, the one or more flow control features comprising a flow channel defined within the griddle, wherein the one or more flow control features further comprises a flow control vane that extends down from the griddle along a vertical direction to redirect the flow of heated air.

17. The griddle assembly of claim 16, wherein the probe receptacle is defined at least in part by a front face, and wherein the flow channel allows the flow of heated air to rise relative to the front face along a vertical direction before reaching the front face.

18. A gas cooktop defining a vertical direction, a lateral direction, and a transverse direction, the gas cooktop comprising:
   a gas burner for selectively generating a flow of heated air; and
   a griddle assembly positioned over the gas burner, the griddle assembly comprising:
      a griddle defining an outer side and a probe receptacle defined in the outer side, wherein the outer side is a front of the griddle along the transverse direction and the probe receptacle is defined at a corner of the griddle;
      a temperature probe configured for receipt within the probe receptacle; and
      one or more flow control features for directing the flow of heated air around or away from the probe receptacle.

19. The gas cooktop of claim 18, further comprising a controller configured to:
   obtain a temperature measurement at the corner of the griddle using the temperature probe; and
   determine a center griddle temperature of the griddle using the temperature measurement and a transfer function or mathematical relationship.

20. The gas cooktop of claim 18, wherein a top wall of the flow channel is positioned above the temperature probe.

* * * * *